(12) United States Patent
Kalm et al.

(10) Patent No.: US 11,066,244 B1
(45) Date of Patent: Jul. 20, 2021

(54) LINEAR INDUCTION SORTER

(71) Applicant: Amazon Technologies, Inc., Seattle, WA (US)

(72) Inventors: William Scott Kalm, Seattle, WA (US); Kevin W Keck, Seattle, WA (US); Thomas Felis, Seattle, WA (US); Kevin Senh Ly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/931,309

(22) Filed: May 13, 2020

(51) Int. Cl.
| | |
|---|---|
| *B65G 17/06* | (2006.01) |
| *B65G 47/84* | (2006.01) |
| *B65G 23/23* | (2006.01) |
| *B65G 47/34* | (2006.01) |

(52) U.S. Cl.
CPC .......... *B65G 17/067* (2013.01); *B65G 23/23* (2013.01); *B65G 47/34* (2013.01); *B65G 47/844* (2013.01); *B65G 2207/36* (2013.01)

(58) Field of Classification Search
CPC ...... B65G 47/34; B65G 23/23; B65G 17/067; B65G 2207/36
See application file for complete search history.

(56) References Cited

U.S. PATENT DOCUMENTS

| | | | | |
|---|---|---|---|---|
| 6,401,914 | B1 * | 6/2002 | Greve | B65G 17/066 198/779 |
| 6,923,308 | B2 * | 8/2005 | Veit | B65G 47/844 198/370.02 |
| 7,086,519 | B2 * | 8/2006 | Veit | B07C 5/362 198/370.02 |
| 9,371,194 | B2 * | 6/2016 | Ragan | B65G 17/345 |

FOREIGN PATENT DOCUMENTS

JP            04016403 A   *   1/1992

OTHER PUBLICATIONS

Danielle Collins, Linear Motion Tips A Design World Resource, Mar. 22, 2019 (see reprint).*

* cited by examiner

*Primary Examiner* — Gene O Crawford
*Assistant Examiner* — Lester Ill Rushin
(74) *Attorney, Agent, or Firm* — Kilpatrick Townsend & Stockton LLP

(57) ABSTRACT

A container sorting system can receive a container on a conveyance surface and convey the container in a conveyance direction. A linear induction motor positioned relative to the conveyance surface (e.g., below) can generate a magnetic field that causes movement of a shoe coupled to the conveyance surface. The shoe can move relative to the conveyance surface and engage the container to change the movement direction of the container. The movement direction of the container can be changed to move the container off of the conveyance surface.

19 Claims, 8 Drawing Sheets

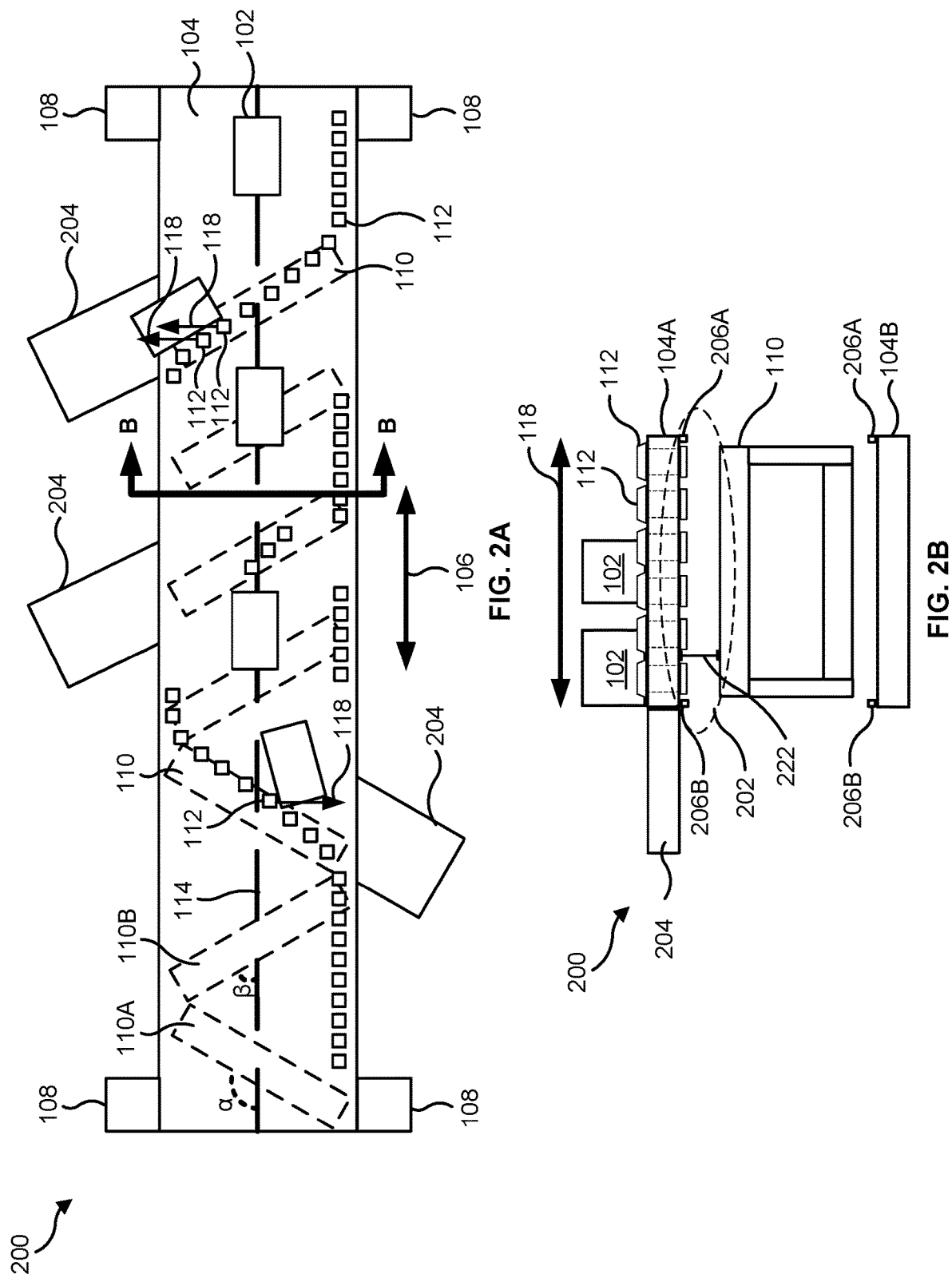

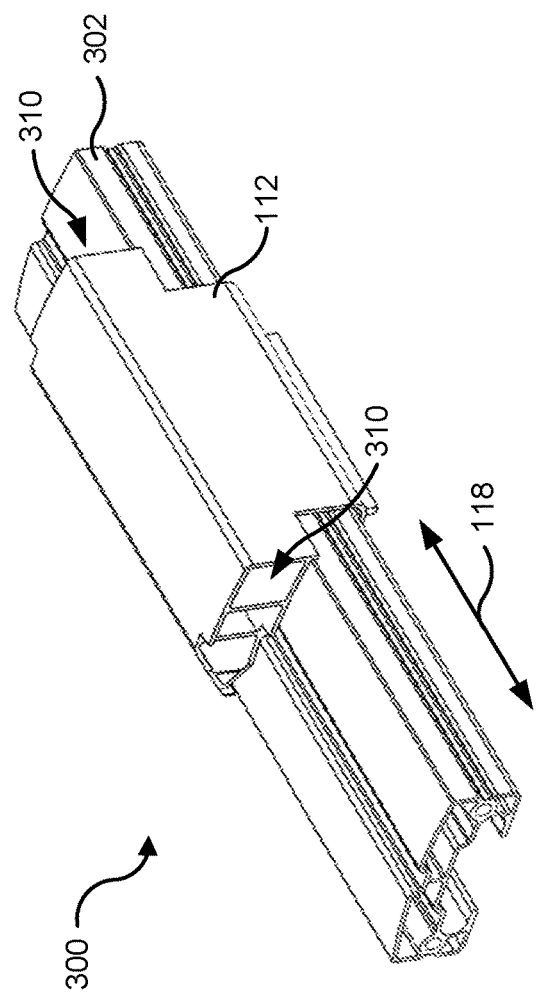
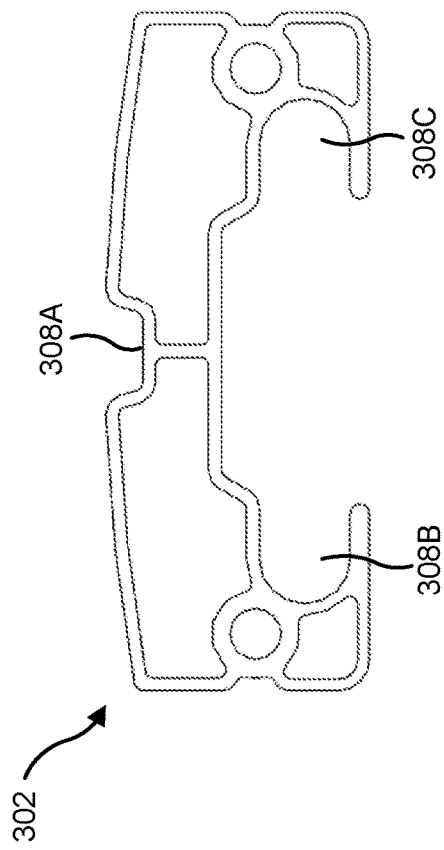
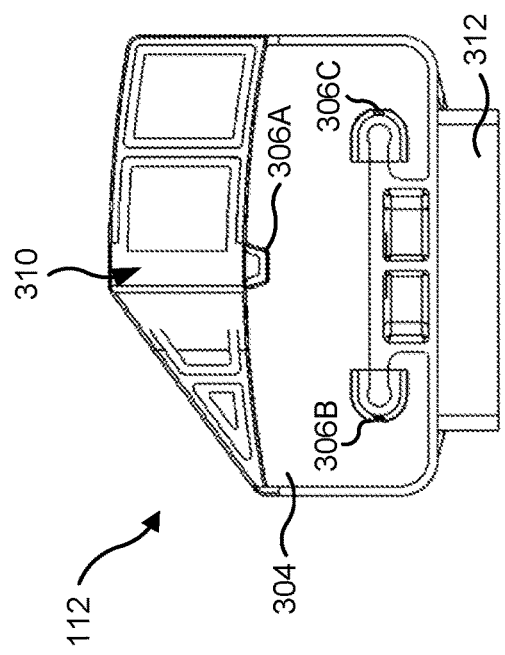

LINEAR INDUCTION SORTER

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space and equipment can result in lower throughput, unacceptably long response times, an ever-increasing backlog of unfinished tasks, and, in general, poor system performance.

BRIEF DESCRIPTION OF THE DRAWINGS

Various embodiments in accordance with the present disclosure will be described with reference to the drawings, in which:

FIG. 2A is a top view of a container sorter that can be used with particular embodiments of the container sorter of FIG. 1;

FIG. 2B is a side view of a cross-section of the container sorter of FIG. 2A, in accordance with particular embodiments;

FIG. 3A illustrates an example of a shoe assembly that can be used with particular embodiments of the container sorter of FIG. 1;

FIG. 3B is a side view of a an example shoe that can be used with particular embodiments of the shoe assembly of FIG. 3A;

FIG. 3C is a side view of an example slat that can be used with particular embodiments of the shoe assembly of FIG. 3A;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a sorting system for moving and managing containers or other items. The techniques described herein may be implemented by any sorting system, but particular examples described herein include a conveyance assembly with a conveyance surface for moving containers in a conveyance direction. Shoes can be coupled with the conveyance surface and induction motors can be positioned below the conveyance surface and generate a magnetic field that causes the shoes to move relative to the conveyance surface and engage with a container.

Turning now to a particular example, in this example, the container sorting system can include a conveyance assembly with a conveyance surface that can receive and convey containers along a conveyance pathway. The conveyance surface can include a plurality of shoe assemblies. The shoe assemblies can include a shoe at least partially surrounding a slat. The shoes can move relative to the slats, for example, by slide along at least a part of the length of the slat. The slats can at least partially define the conveyance surface and can be connected to one another via hinged connections that allow the slats to pivot relative to one another. Linear induction motors can be positioned adjacent to the conveyance surface. For example, the linear induction motors can be positioned beneath the conveyance surface. The linear induction motors can be energized to generate a magnetic field. The magnetic field can cause the shoes to slide along the slats, for example, to engage with a container borne by the conveyance surface. The shoe assemblies can engage with the container and cause the container to move in a direction other than the conveyance direction. For example, the shoe assemblies can engage with the container to move the container off of the conveyance surface.

While exemplary embodiments are described with reference to containers and container sorting systems, and the like, the systems and techniques described herein are also applicable to any other items and/or suitable packaging containers (e.g., bags, boxes, totes, envelopes, pouches, sacks, jugs, and other similar containers).

Figure 1:
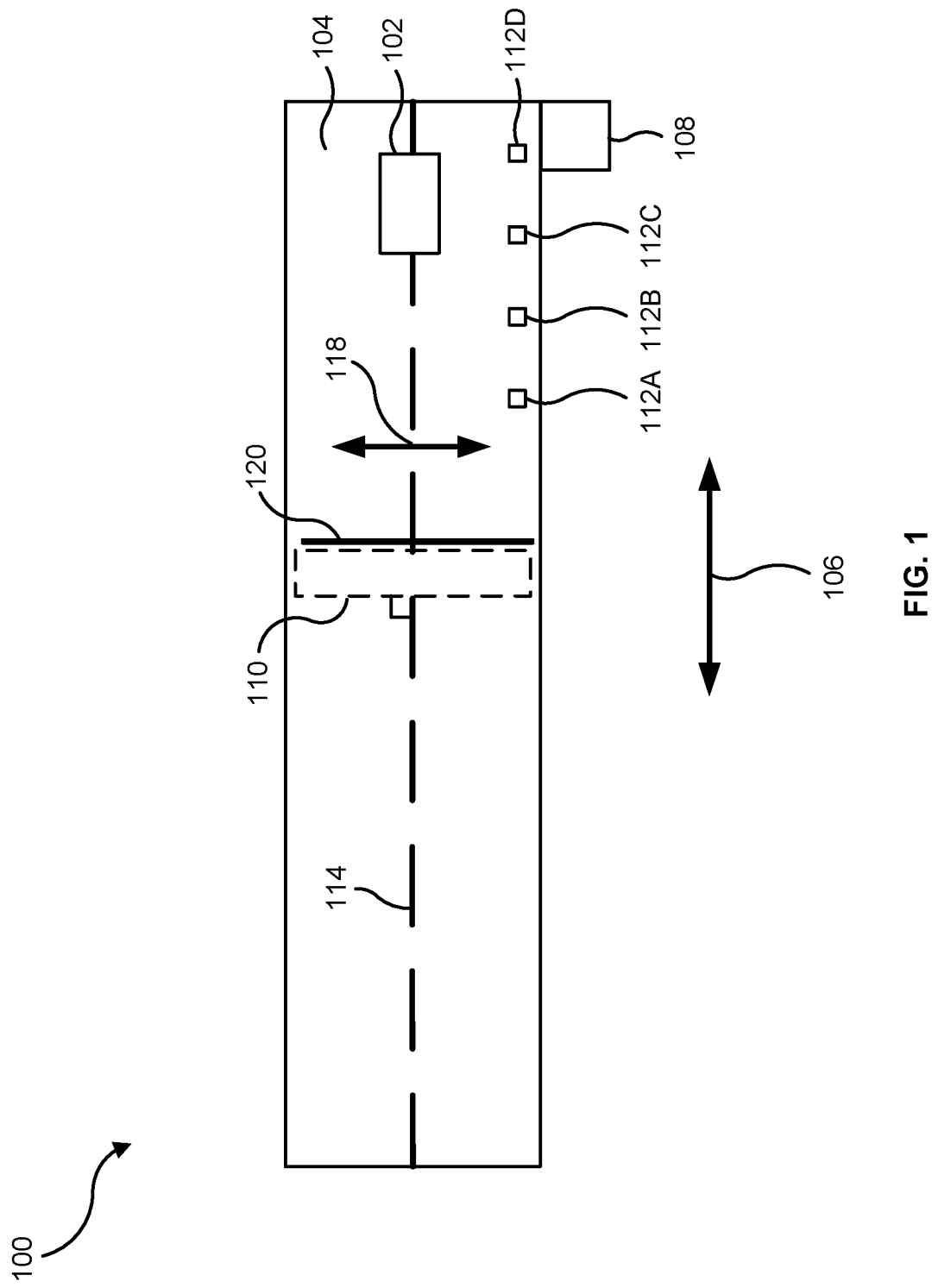
FIG. 1 is a top view of a simplified container sorter, in accordance with embodiments, for sorting containers.

Turning now to the figures, FIG. 1 illustrates a top view of a simplified container sorter 100 for moving and sorting containers 102. The container sorter 100 can be positioned in a warehouse environment, for example, in a warehouse environment where containers 102 are being moved, sorted, and/or stored. The container sorter 100 can include a conveyance surface 104 for receiving and conveying containers 102 in a conveyance direction 106. The conveyance surface 104 can be driven by one or more motors 108 to advance the conveyance surface in the conveyance direction 106. One or more shoes 112 positioned on the conveyance surface 104 can engage with the containers 102 to change the movement direction of the containers. The shoes 112 can be moved relative to the conveyance surface 104 using one or more linear motors 110 positioned adjacent to the conveyance surface.

In a variety of embodiments described herein, the linear motors 110 can be or include linear induction motors to move the shoes 112 relative to the conveyance surface 104, or to induce rotation of a rotor to advance the conveyance surface. As known by those skilled in the art, linear induction motors (often referred to as LIMS) generally include a primary that acts on a secondary. In various embodiments, the primary can be or include linear induction motors 110 and the secondary can be or include at least a portion of shoes 112. In further embodiments, the primary can be or include magnets (e.g., electromagnets) and the secondary can be a rotatable secondary. The primary can be formed as a three-phase coil assembly. The three-phase coils can be wound and inserted into slots cut into a slab. The secondary can include a conducting material, for example, a ferrous material (e.g., steel) or non-ferrous material (e.g., aluminum or copper). Three-phase AC power can be applied to the primary, inducing a travelling electromagnetic flux wave that moves relative to the primary. The electromagnetic flux wave can induce an electric current in the secondary (e.g., eddy currents). The induced electric current can interact with the magnetic flux wave to produce a linear force. The electromagnetic force wave can be varied by changing the input frequency using an adjustable frequency drive. In the disclosed embodiments (including those employing rotors driven by LIMs), the same general principles are employed. However, in embodiments where the secondary is a rotor, the induced magnetic fields may apply forces that generate linear motion in the rotor. The rotation of the rotors may result in the forces acting at an angle to the actual motion of the acted upon portion of the rotor.

The linear motors 110 can be positioned adjacent to the conveyance surface 104 and energized to generate a magnetic field. For example, the linear motor 110 can be positioned beneath the conveyance surface 104, however, the linear motor may be positioned above, to the side, or in any suitable position for generating the magnetic field. The linear motor 110 can be oriented at an angle relative to a lateral centerline 114 of the conveyance surface 104. For example, as shown in FIG. 1, the linear motor 110 can be oriented at a 90 degree angle relative to the lateral centerline 114. The magnetic field can be generated along at least a part of the length of the linear motor 110 to cause movement of one or more shoes 112, for example, along direction 118. Direction 118 may be perpendicular, non-parallel, or otherwise different from direction 106.

The linear motor 110 can be energized to generate the magnetic field at specific intervals to cause movement of specific shoes 112. For example, the magnetic field can cause movement of a first shoe 112A and third shoe 112C without causing movement of a second shoe 112B or a fourth shoe 112D. Additionally, causing the shoe 112 to move without contacting the shoe assemblies prevents or reduces mechanical failures that may otherwise occur. The shoes 112 can engage with a container 102 positioned on the conveyance surface 104. For example, the shoes 112 can engage with the container 102 to change an orientation and/or conveyance direction of the container 102, move the container off of the conveyance surface 104, or otherwise re-position and/or re-orient the container 102.

In various embodiments, one or more sensors 120 can be positioned to detect the position of the containers 102 on the conveyance surface 104. For example, the sensors 120 can be positioned to detect the leading edge of a container 102 to determine when to energize the linear motor 110. A sensor 120 is shown positioned above the conveyance surface 104, however, the sensors can be positioned below, to the side, or in any suitable position for detecting the containers 102. The sensors 120 can be or include optical, mechanical, digital, infrared, or any suitable sensor for detecting the containers 102.

Turning to FIGS. 2A and 2B, a container sorter 200 is illustrated that can be used with particular embodiments of the container sorter 100 of FIG. 1. Specifically, FIG. 2A is a top view of the container sorter 200 and FIG. 2B is a side view of a cross-section of the container sorter 200. The container sorter 200 can include a conveyance surface 104 driven by one or more motors 108. The conveyance surface 104 can be at least partially defined by a plurality of slats. Shoes 112 can be positioned on the conveyance surface 104. The shoes 112 can at least partially surround the slats and can move relative to the slats. For example, the shoes 112 can move along at least a part of the length of the slats. Linear motors 110 can be positioned beneath the conveyance surface 104 and/or otherwise located at a suitable position relative to the conveyance surface 104 to generate a magnetic field 202 that can cause movement of the shoes 112 (e.g., in a direction other than the conveyance direction 106). The shoes 112 can include material that when introduced to the magnetic field 202 causes movement of the shoes. For example, the shoes 112 can include material that, when brought into the magnetic field 202, generates a force for moving the shoes. For example, the shoes 112 can include a ferromagnetic material and the magnetic field 202 can induce eddy currents in the ferromagnetic material when the shoes are brought near and/or are positioned within the magnetic field. The induced eddy currents can generate a magnetic force that is the inverse of the magnetic field 202, causing the shoes 112 to move. The shoes 112 can move in response to the magnetic field 202 to engage with one or more containers 102. For example, the shoes 112 can engage and move the containers 102 off of the conveyance surface 104 and onto an output conveyor 204.

The containers 102 can be or include a container or a bin with an interior area for containing one or more items. The containers 102 may include rigid or semi-rigid material, for example, plastic, cardboard, paper, or any suitable material for containing items. In some embodiments, the containers 102 can include handles, hooks, engagement surfaces, or other features and/or components for engaging with the conveyance surface 104 and/or the shoes 112. In further embodiments, the containers 102 may be items, e.g., such that the items are moved by the conveyance surface 104 and/or the shoes 112 without first being positioned in a container.

The conveyance surface 104 can receive one or more containers 102 and convey the containers along conveyance direction 106. The containers 102 can be positioned on the conveyance surface 104 at various positions. For example, the conveyance surface 104 can receive the containers 102 along a lateral centerline 114. However, the conveyance surface 104 may receive the containers 102 on either side of the lateral centerline 114. The conveyance surface 104 can be or include a material that engages with the containers 102 to aid in conveying the containers. For example, the conveyance surface 104 can be or include metal, rubber, silicon, or any suitable material for aiding in engaging with the containers 102. In some embodiments the conveyance surface 104 can be or include material that allows the containers 102 to slide on the conveyance surface. For example, the material may allow the containers 102 to slide in response to the shoes 112 engaging with the containers 102.

The conveyance surface 104 can convey the containers 102 along conveyance direction 106. As shown in FIG. 2A, the conveyance surface 104 conveys the containers 102 in the conveyance direction 106 from right to left. However, the conveyance direction 106 may be from left to right. In some embodiments the conveyance surface 104 can convey the containers 102 along multiple conveyance directions 106 (e.g., from right to left and from left to right).

The conveyance surface 104 can move in a continuous loop. For example, as shown in FIG. 2B, the conveyance surface 104 can include an upper conveyance surface 104A and a lower conveyance surface 104B. The upper conveyance surface 104A can convey the containers 102 in a first direction (e.g., conveyance direction 106) and the lower conveyance surface 104B can recirculate the conveyance surface in a second opposing direction.

The conveyance surface 104 can include slats connected to one another via a hinged or pivoting connection. In various embodiments, the slats can be connected to one another via chains 206 positioned on opposing sides of the slats (e.g., a first chain 206A on a first side and a second chain 206B on a second side). The chains 206 can at least partially define a continuous conveyance pathway. For example, the first chain 206A and the second chain 206B can define a continuous loop and the slats can span between the first and second chains. The chains 206 can include links and/or hinged components that allow the slats to pivot relative to one another. The chains 206 can additionally or alternatively be used to drive the conveyance surface 104 in the conveyance direction 106. The chains 206 can be or include metal, plastic, rubber, or any suitable material that is strong enough to convey the conveyance surface 104 and/or the containers 102.

The conveyance surface 104 and/or the chains 206 can be connected to one or more motors 108 for advancing the conveyance surface. For example, the motor 108 can include a sprocket that can engage with the chains 206 to drive the conveyance surface 104. The motor 108 can be or include an induction motor, an electric motor, a gas motor, or any suitable motor for driving the conveyance surface 104. In various embodiments, motors 108 can be positioned on each end of the continuous conveyance surface 104. For example, two motors 108 can be positioned on each end of the continuous conveyance surface 104 (e.g., one motor on each side of the conveyance surface).

A linear motor 110 can be positioned beneath the conveyance surface 104. As shown in FIG. 2B, the linear motor 110 can be positioned between the upper conveyance surface 104A and the lower conveyance surface 104B. The linear motor 110 can be positioned a distance 222 away from the bottom of the conveyance surface 104. The distance 222 can be a static distance or may be changing. For example, distance 222 can be changed to reduce the amount of magnetic field 202 that may interference with the containers 102. The linear motor 110 can be oriented at an angle relative to the lateral centerline. The linear motors 110 may be oriented at multiple angles. For example, a first linear motor 110A may be oriented at angle α and a second linear motor 110B may be oriented at angle β. Angle α may be an angle in a range between 10 degrees and 90 degrees and angle β may be an angle in a range between 90 degrees and 170 degrees. However, the angle may be any suitable angle. The linear motor 110 can be oriented at an angle relative to the lateral centerline 114 to aid in removal of the containers 102 from the conveyance surface 104. For example, the linear motor 110 can be oriented at a first angle to aid in the removal of the container 102 from a first side of the conveyance surface 104 and the linear motor can be oriented at a second angle to aid in the removal of the container from a second side of the conveyance surface. The linear motor 110 may additionally or alternatively be angled to aid in removal of the containers 102 when the conveyance surface 104 is being advanced in multiple directions. For example, a linear motor 110 can be oriented at a first angle to aid in the removal of the container from a first side of the conveyance surface 104 when the conveyance surface is conveyed in a first direction and the linear motor can be oriented at a second angle to aid in the removal of the container from the first side of the conveyance surface when the conveyance surface is conveyed in a second direction.

The linear motor 110 can generate a magnetic field 202 that interacts with the shoes 112. The linear motor 110 can produce a linear force along its length. The linear motor 110 can include a flat magnetic core with transverse slots. Coils can be laid in the slots and energized to produce a magnetic field 202. The magnetic field 202 can be a linearly moving magnetic field that can generate eddy currents in a conductor (e.g., a ferromagnetic conductor). The linear motor 110 can be or include a linear induction motor or any suitable motor for generating a magnetic field 202. In some embodiments, the linear motor 110 can be or include a magnet (e.g., a rotating permanent magnet or an electromagnet). In various embodiments, the magnetic field 202 generated by the linear motor 110 can penetrate only a portion of the conveyance surface 104 such that the magnetic field 202 does not reach and/or does not negatively impact the containers 102 on the conveyance surface or contents therein.

The shoes 112 can be connected with the conveyance surface 104 at various positions. The shoes 112 can be conveyed by the conveyance surface 104 in the conveyance direction 106. The shoes 112 can move relative to the conveyance surface 104, for example, in a direction other than the conveyance direction 106. For example, the shoes 112 may move in direction 118. Direction 118 can be perpendicular to the conveyance direction 106, however, direction 118 may be any suitable direction. The magnetic field 202 can cause the shoes 112 to move relative to the conveyance surface 104. In some embodiments, the shoes 112 can have a portion positioned on opposing sides of the conveyance surface 104. As shown in FIG. 2B and described in more detail in FIGS. 3A through 3C, the shoes 112 can have an upper portion positioned above the conveyance surface 104. The upper portion of the shoe 112 can have a surface for engaging with the containers 102. A lower portion of the shoe 112 can be positioned beneath the conveyance surface 104. The lower portion of the shoe 112 can be or include a conductor that interacts with the magnetic field 202. For example, the lower portion of the shoe 112 can be or include a piece of metal that, when positioned in the magnetic field 202 can produce eddy currents in the metal creating an opposing magnetic field in accordance with Lenz's law. The opposing fields can repel each other, causing the shoes 112 to move. For example, the magnetic field 202 can cause the shoes 112 to move in direction 118.

In various embodiments, the lower portion of the shoes 112 can be adjusted to move the lower portion closer to and/or further away from the linear motor 110. For example, the lower portion of the shoes 112 can be moved away from the conveyance surface 104 and/or towards the linear motor 110. The lower portion of the shoes 112 can additionally or alternatively be adjusted to aid in the movement of the shoes 112. For example, the lower portion of the shoes 112 can be moved to position more of the lower portion of the shoes in the magnetic field 202.

In various embodiments, the linear motors 110 can be energized to cause movement of a series of shoes 112. For example, the linear motors 110 can generate a magnetic field 202 that causes a series of shoes 112 that reach the linear motor to move in direction 118. The linear motors 110 can additionally or alternatively be shut off to stop movement of the shoes 112. For example, the shoes 112 can be moved only a part of the lateral distance of the conveyance surface 104. Turning off the linear motors 110 can cause the shoes 112 to stop and remain in the same lateral position. However, turning off the linear motors 110 may allow the shoes 112 to move and/or coast to a different lateral position. For example, the linear motors 110 can be turned off before the container 102 is completely removed from the conveyance surface 104 and the shoe 112 can continue to push the container off of the conveyance surface.

One or more of the shoes 112 can engage with the containers 102 and move the containers in a direction other than the conveyance direction 106. The shoes 112 can engage with the containers 102 and change the direction of travel of the containers. For example, the shoes 112 can engage the containers 102 and push and/or pivot the containers. The shoes 112 can engage the containers 102 and move the containers off of the conveyance surface 104. The shoes 112 can move the containers off of the conveyance surface 104 and onto an output conveyor 204 for conveyance to another location (e.g., another location in the warehouse environment). The output conveyors 204 can be angled relative to the lateral centerline 114, for example, to aid in moving the containers 102 off of the conveyance surface 104.

Turning to FIGS. 3A through 3C, a shoe assembly 300 including a shoe 112 and a slat 302 is illustrated. The shoe 112 can include an opening 304 sized and shaped for receiving the slat 302. One or more protrusions 306 can extend into the opening 304 to engage with opposing grooves 308 in the slat 302. For example, a first protrusion 306A can engage with a first groove 308A, a second protrusion 306B can engage with a second groove 308B, and a third protrusion 306C can engage with a third groove 308C. The protrusions 306 and the grooves 308 can aid in aligning the shoe 112 and the slat 302. For example, the protrusions 306 and the grooves 308 can align the shoe 112 and the slat 302 while the shoe moves along direction 118. The protrusions 306 can extend some or all of the length of the shoe 112 and/or the grooves 308 can extend some or all of the length of the slat 302. The protrusions 306 and/or the grooves 308 can be or include plastic, rubber, metal, or any material suitable to withstand engaging with containers 102.

In various embodiments, the shoe 112 can include one or more engagement surfaces 310 for engaging with the containers 102. For example, the engagement surfaces 310 can be sized and shaped to engage with a side of the containers 102. The engagement surfaces 310 can be or include an engagement device and/or material to aid in engaging with the containers 102. For example, the engagement surfaces 310 can be or include a magnet, glue, a suction cup, hook and loop connectors, or any suitable connector for engaging with the containers 102.

In further embodiments, the shoe 112 can include a secondary body 312 that reacts to the magnetic field 202. For example, the secondary body 312 can be or include a plate, a metal device, or other conductive material that produces eddy currents when the secondary body is moved into the magnetic field 202. In various embodiments, the secondary body 312 can include a non-ferrous material backed by a ferrous material. The eddy currents can generate an opposing magnetic force, causing the shoe 112 to move along the length of the slat 302 in direction 118. The eddy currents can generate a force in the shoe 112 (e.g., an opposing magnetic force). The force generated in the shoe 112 can cause the shoe to move along some or all of the slat 302. For example, the shoe 112 can be moved along at least a part of the length of the slat 302. The shoe 112 can move with enough force such that when the shoe engages with a container 102, the container is moved. For example, the shoe 112 can engage the container 102 with enough force to pivot and/or push the container 102.

The shoe 112 can be conveyed in the conveyance direction 106 by the conveyance surface 104. The linear motors 110 can generate a magnetic field 202 and the shoes 112 can be conveyed into the magnetic field 202 to cause movement of the shoes. For example, the linear motors 110 can be positioned at an angle relative to the lateral centerline 114 of the conveyance surface 104 and generate a magnetic field 202 along the length of the linear motors (i.e., the magnetic field 202 is at an angle relative to the lateral centerline). As the shoes 112 are conveyed in the conveyance direction, the shoes enter the angled magnetic field and an eddy current is induced in the shoes. The eddy currents generate a force in the shoes 112 that cause the shoes to move relative to the conveyance surface 104. The angled linear motor 110 in combination with the conveyance of the shoes causes the shoes 112 to move perpendicular to the conveyance direction 106 (e.g., the conveyance direction vector and the angled magnetic force vector result in a shoe movement vector that is perpendicular to the conveyance direction).

In some embodiments, the linear motors 110 can generate a magnetic field 202 that causes the shoes 112 to move in a desired direction. For example, the linear motors 110 can generate a magnetic field 202 that causes the shoes 112 to move regardless of the conveyance direction 106. In further embodiments the linear motors 110 can move relative to the conveyance surface 104 to cause movement of the shoes 112. For example, a linear motor 110 can be moved to generate magnetic fields 202 to cause movement of the shoes 112 in a desired direction.

Figure 4A:
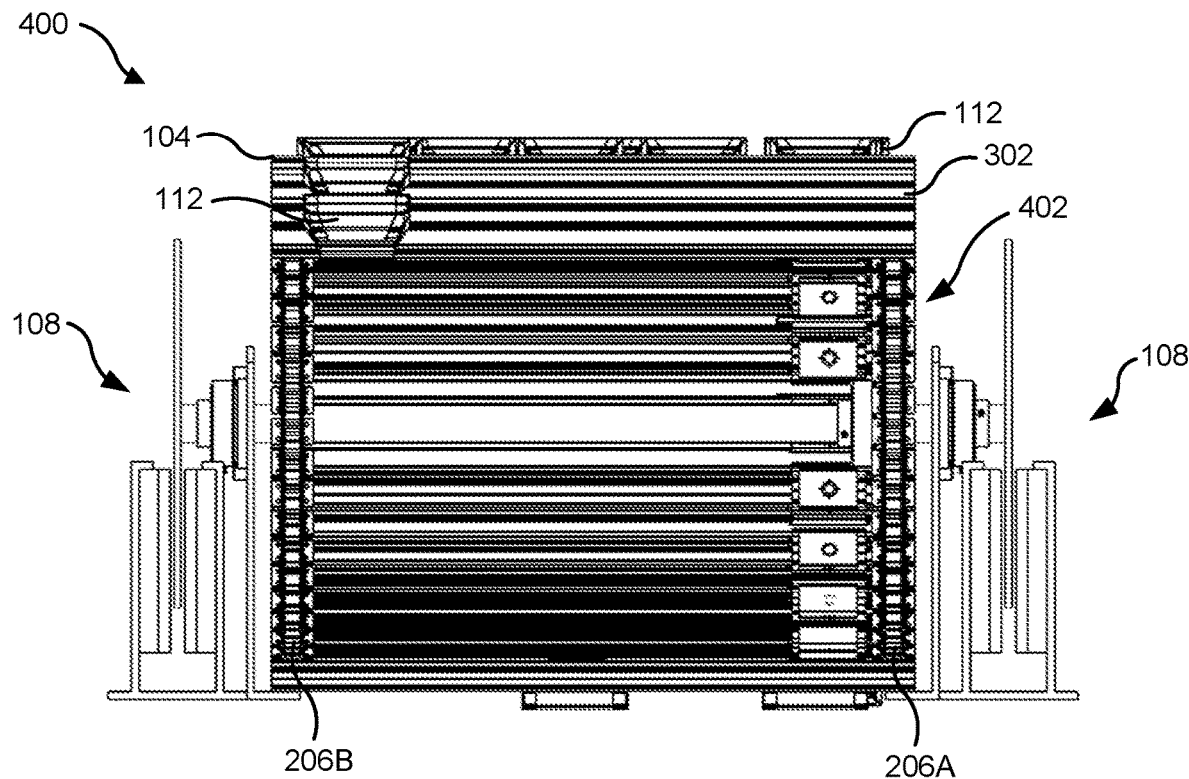
FIG. 4A is an example drivetrain assembly that can be used with particular embodiments of the container sorter of FIG. 1.
Figure 4B:
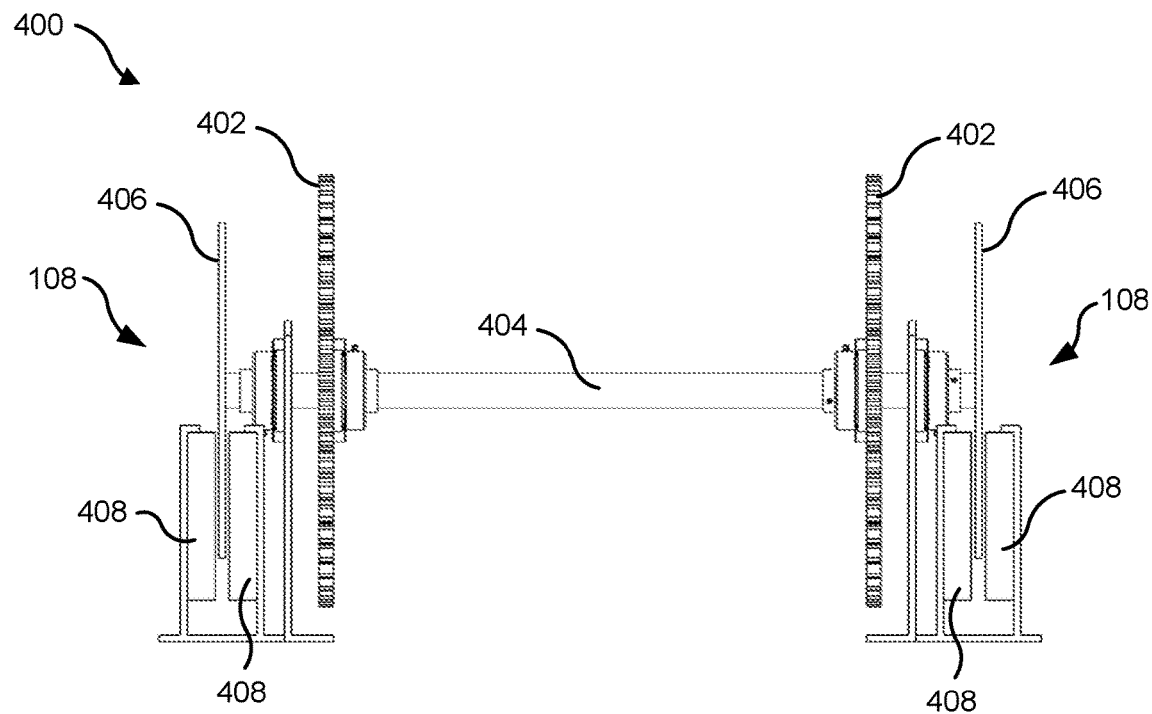
FIG. 4B is a portion of the example drivetrain assembly of FIG. 4A.

Turning to FIGS. 4A and 4B, an example drivetrain assembly 400 is depicted. FIG. 4A shows the drivetrain assembly 400 positioned within the conveyance surface 104, while FIG. 4B shows the drivetrain assembly 400 with shoes 112 and slats 302 removed to better show the drivetrain assembly. The drivetrain assembly 400 can include one or more motors 108 connected to one or more sprockets 402. As shown in FIG. 4A, the drivetrain assembly 400 can be coupled with the conveyance surface 104 to advance the conveyance surface, for example, in conveyance direction 106. One or more motors 108 can be positioned on each side of the conveyance surface 104. The motors 108 can be connected to one or more sprockets 402. The sprockets 402 can engage with chains 206 to advance the conveyance surface 104.

Figure 4C:
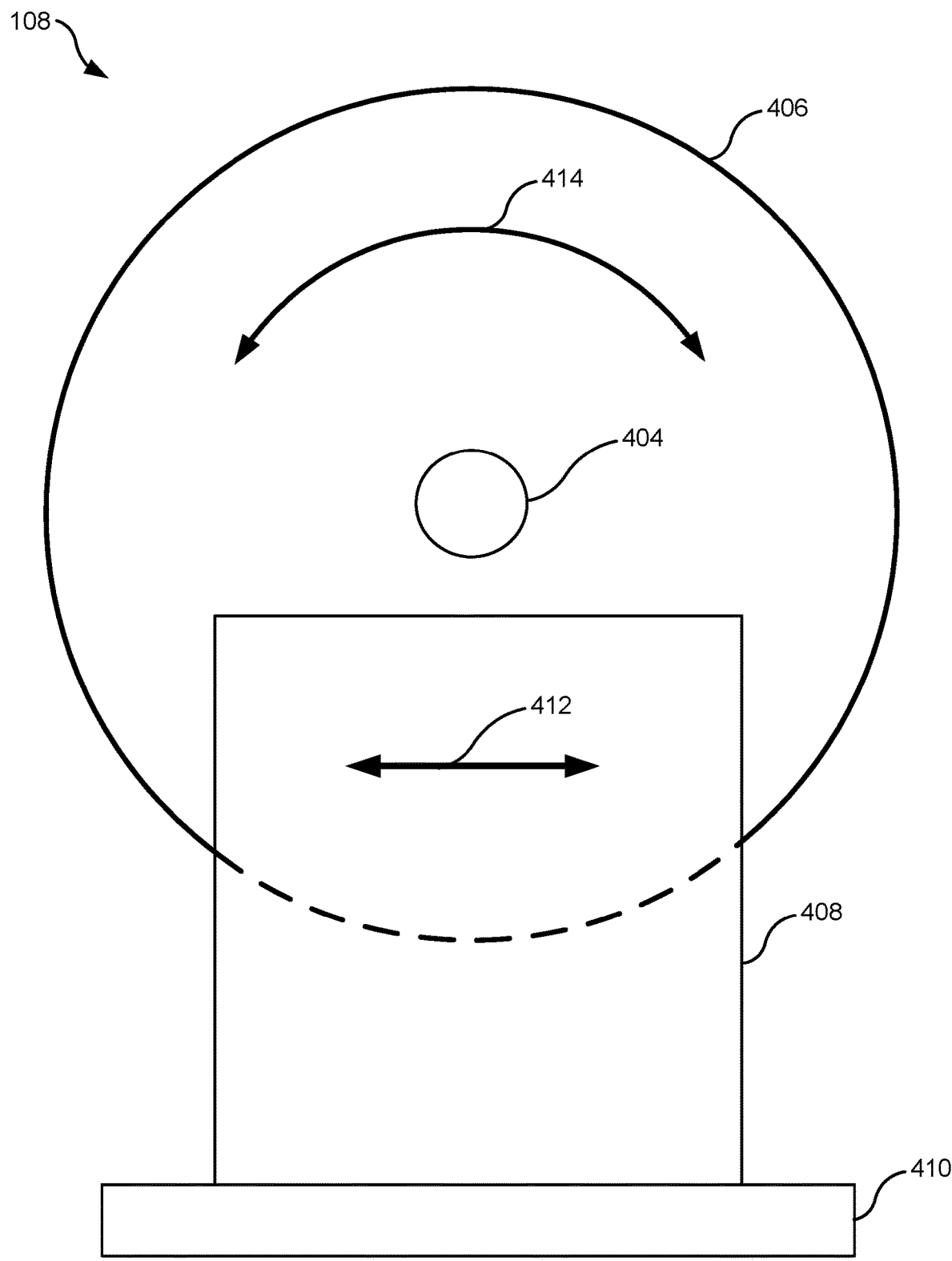
FIG. 4C is a side view of an example motor for use with the drivetrain assembly of FIG. 4A.

As shown in FIG. 4C, the motors 108 can be or include a double sided linear induction motor supported by a base 410 with multiple primaries and a secondary. In various embodiments, the multiple primaries are magnets 408 and the secondary is a disk 406. In an illustrative embodiment, the secondary is a rotatable secondary (e.g., the disk 406) coupled with a sprocket (e.g., sprocket 402) and configured to rotate in response to a changing magnetic field generated by two primaries (e.g., magnets 408) positioned on opposing sides of the secondary. The disk 406 can be or include conductive material. In various embodiments, the disk 406 can include non-ferrous material. The non-ferrous material can prevent the disk 406 from being attracted to the magnets 408 (e.g., prevents the disk from being pulled toward the magnets and out of alignment). In various embodiments, the disks 406 include copper or aluminum. The magnets 408 can generate a changing magnetic field that acts on the disk 406. The magnetic field generated by the magnets 408 can induce eddy currents in the disk 406. The eddy currents result in a force along direction 412 and under the influence of these forces in accordance with Lenz's law the rotor can move along rotary direction 414. Direction 412 can be parallel to a plane that intersects the center of the disk 406. Direction 414 can be a rotational direction around, for example, a clockwise or counter-clockwise direction. In various embodiments, the disk 406 can rotate in direction 414 about a center of the disk and/or about the driveshaft 404.

The disk 406 can be connected to the sprockets 402 via driveshaft 404. The coupling can allow the disk 406 to spin and cause the sprocket to spin. Multiple disks 406 and/or motors 108 can be coupled together via the driveshaft 404 to rotate multiple sprockets 402, for example, sprockets on opposing sides of the conveyance surface 104. The motors 108 can be synced together to rotate the sprockets 402 at the same speed. For example, the magnets 408 of multiple motors 108 can be energized at the same time to keep multiple motors in sync.

Figure 5:
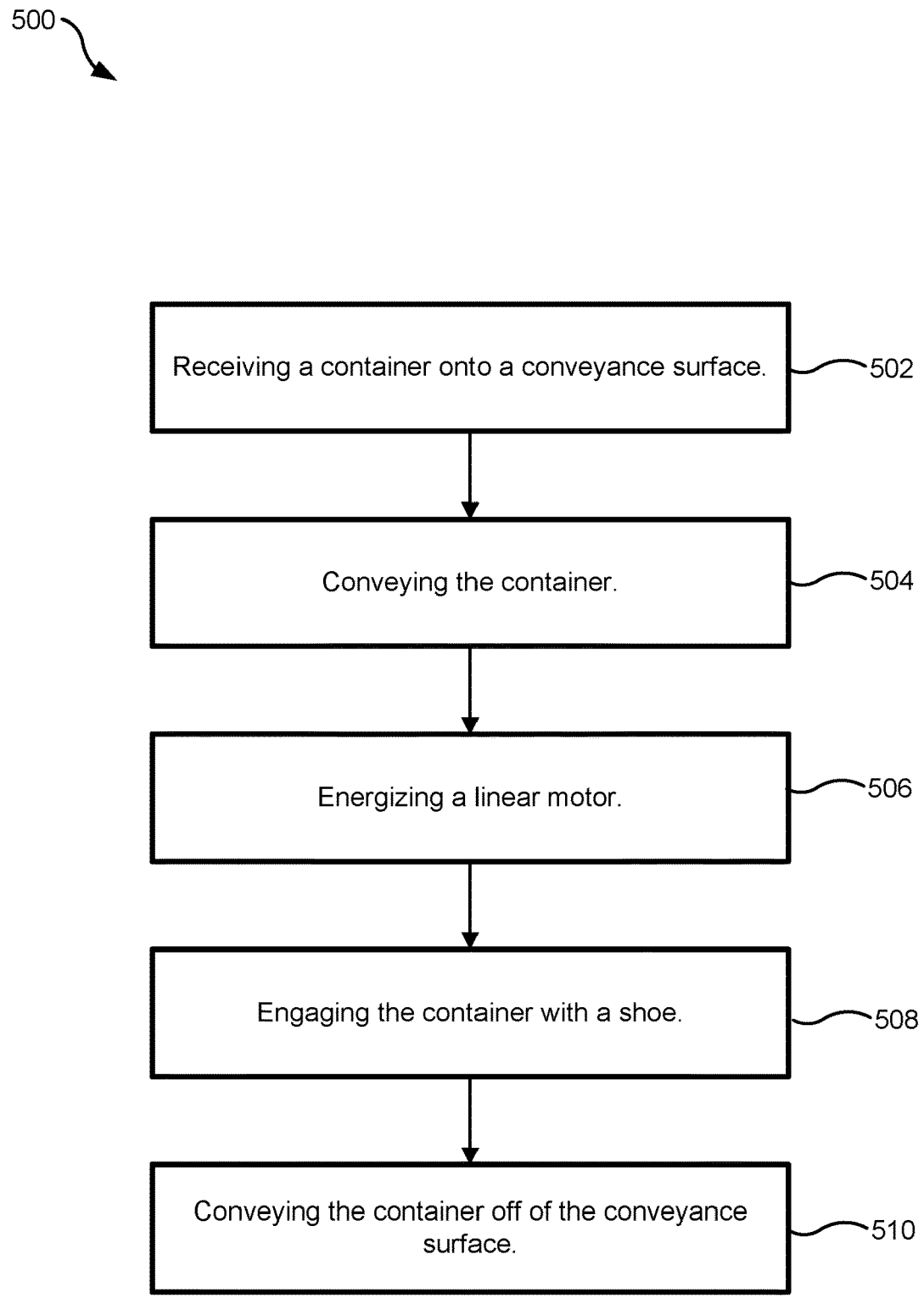
FIG. 5 is a flowchart illustrating a process for sorting containers that can be used with particular embodiments of the container sorter of FIG. 1.

Turning now to FIG. 5, a flowchart illustrating a process 500 for sorting containers 102 using the container sorter 100 of FIG. 1 is shown. Various blocks of the process 500 are described by referencing the components shown in FIGS. 6 through 13, however, additional or alternative components may be used with the process. FIGS. 6 through 13 illustrate the example process 500 using particular embodiments of the example container sorter 100 of FIGS. 1 through 4. The process 500 is primarily described with containers 102 being conveyed in a single conveyance direction 106 (e.g., from right to left). However, the containers 102 can be conveyed in multiple conveyance directions 106.

Figure 6:
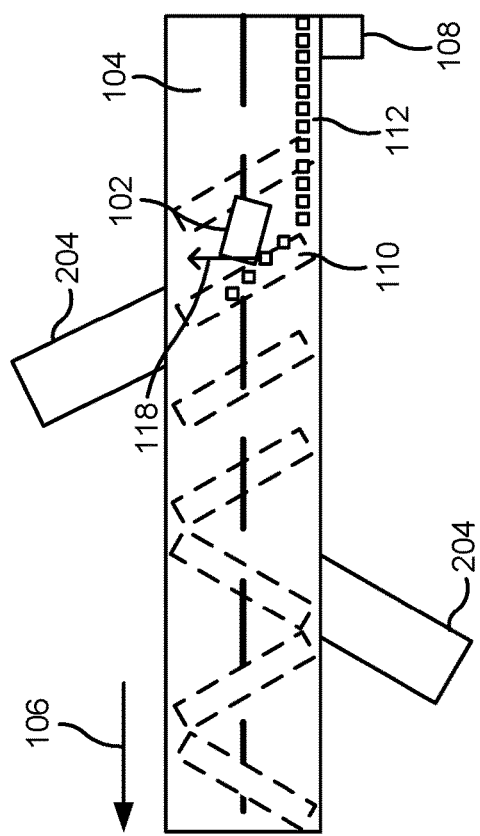
FIGS. 6 through 13 illustrate various states of components that may be implemented in a simplified example of a process for sorting containers that can be used with particular embodiments of the container sorter of FIG. 1.
Figure 10:
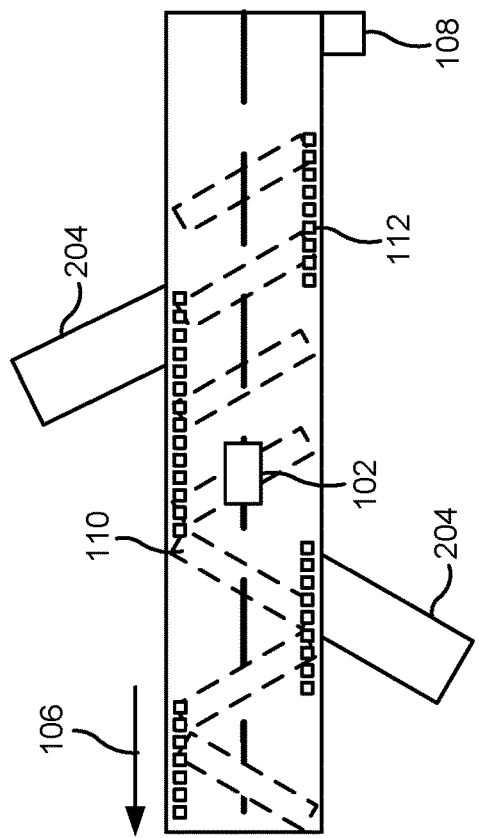

The process 500 at block 502 can include receiving a container (e.g., container 102) onto a conveyance surface (e.g., conveyance surface 104). As shown in FIGS. 6 and 10, the container 102 can be received on the conveyance surface 104 along a lateral centerline 114. One or more shoes (e.g., shoes 112) can be positioned on one or more sides of the container 102.

The process 500 at block 504 can include conveying the container 102. As shown in FIG. 10, the container can be conveyed in conveyance direction 106. The container 102 can be conveyed by operating a motor (e.g., motor 108) to advance the conveyance surface 104. The conveyance surface 104 can be advanced to convey the container 102 to a position. For example, the container 102 can be conveyed until the container reaches a linear motor (e.g., linear motor 110).

Figure 7:
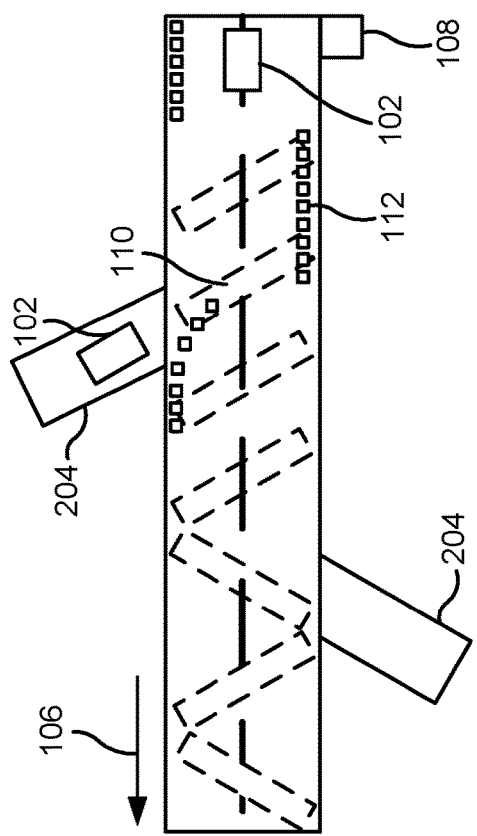
Figure 11:
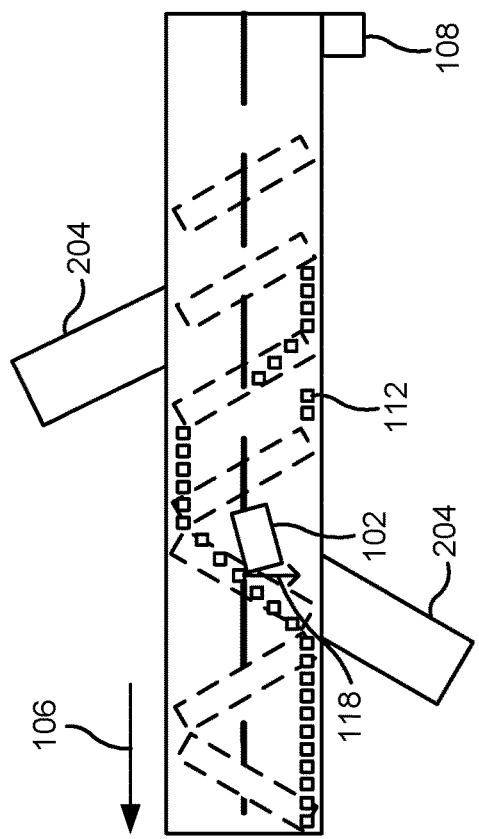

The process 500 at block 506 can include energizing a linear motor 110. The linear motor 110 can be energized based on a position of the container 102. For example, the linear motor 110 can be energized before the container 102 is conveyed to a position above the linear motor 110. Energizing the linear motor 110 can cause shoes (e.g., shoes 112) to move in a direction to engage with a container 102. As shown in FIGS. 7 and 11, the shoes 112 move in a direction other than the conveyance direction 106 to engage with the containers 102. For example, the shoes 112 can move in a direction (e.g., direction 118). The shoes 112 can move in a direction 118 that is perpendicular to the conveyance direction 106. However, the shoes 112 may be moved in any suitable direction.

Figure 8:
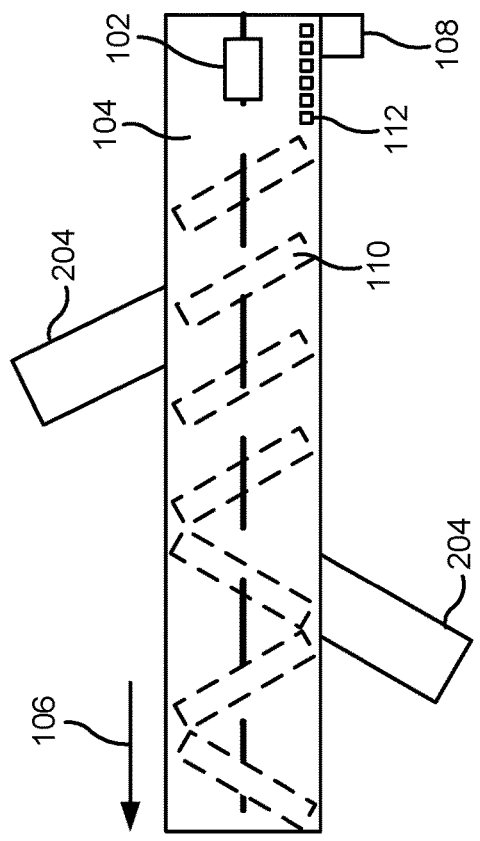
Figure 12:
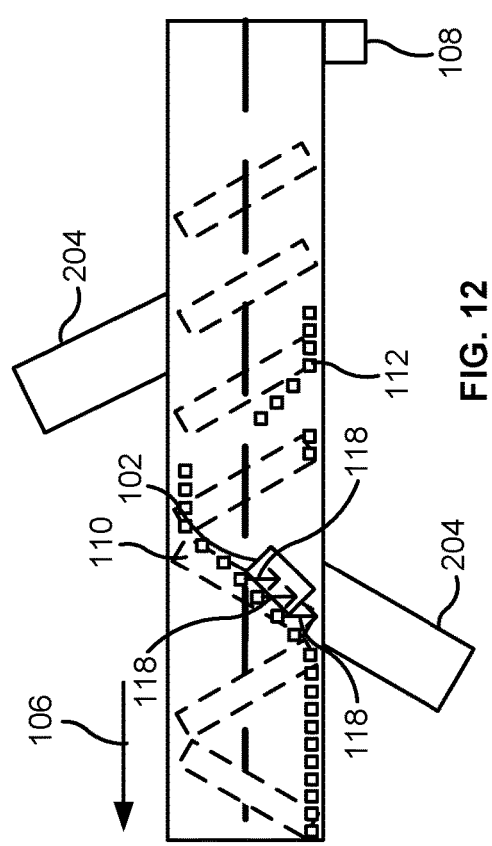

The process 500 at block 508 can include engaging the container 102 with the shoes 112. The shoes 112 can engage the container 102 with an engagement surface. As shown in FIGS. 8 and 12 the shoes 112 can change the conveyance direction of the containers 102, for example, from conveyance direction 106 to a direction other than the conveyance direction. In various embodiments, engaging the container 102 with the shoes 112 can pivot and/or push the container towards a side of the conveyance surface 104.

Figure 9:
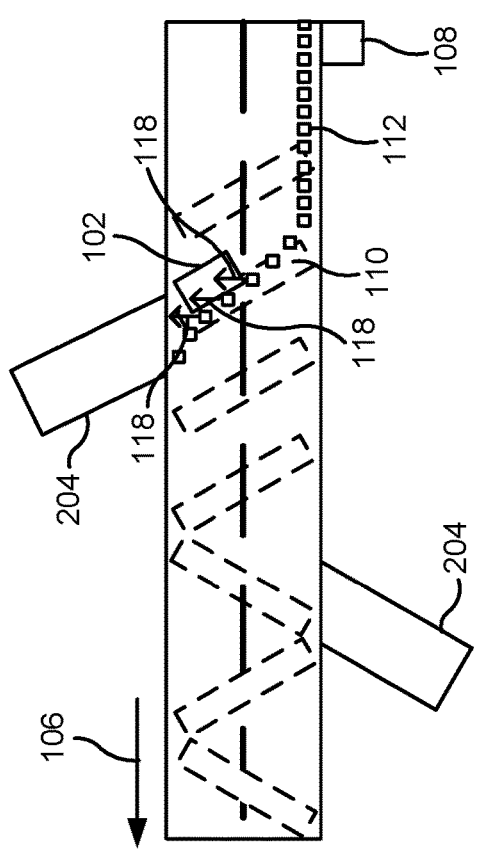
Figure 13:
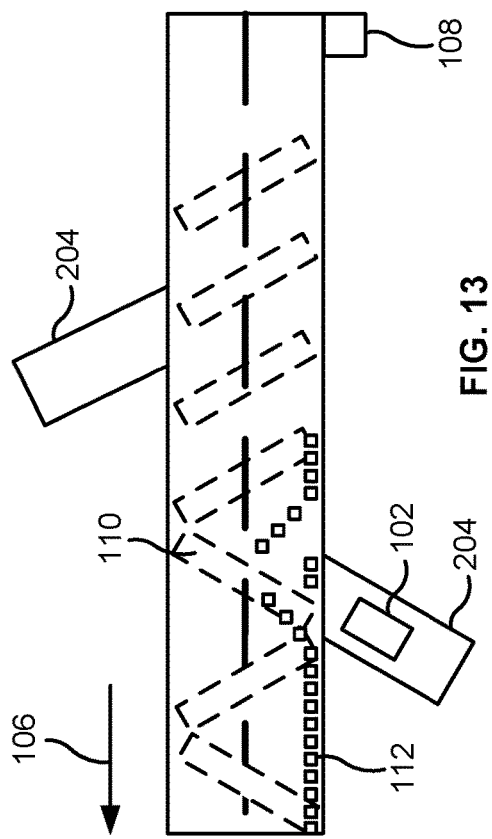

The process 500 at block 510 can include conveying the container 102 off of the conveyance surface 104. As shown in FIGS. 9 and 13, the shoes 112 can engage the containers 102 and push the containers onto an output conveyor (e.g., output conveyor 204). The output conveyor 204 can convey the containers 102 to another area. For example, the output conveyors 204 can convey the containers 102 to another area of a warehouse environment.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A sorting system comprising:
    a conveyance assembly positioned in a warehouse environment and comprising a conveyance surface at least partially defined by a plurality of slats hingeably coupled to one another along adjacent edges, the conveyance surface having a lateral centerline and configured to convey a container in a conveyance direction parallel with the lateral centerline;
    a linear induction motor positioned below the conveyance surface and oriented at an angle relative to the lateral centerline of the conveyance surface, the linear induction motor configured to generate a changing magnetic field based on at least a position of the container on the conveyance surface; and
    a shoe sized and shaped to at least partially surround a slat of the plurality of slats and having a first portion positioned on an opposing side of the conveyance surface from the linear induction motor, the shoe configured to, in response to the changing magnetic field, move relative to the slat in a direction perpendicular to the conveyance direction along at least a part of a length of the slat and engage the container.

2. The sorting system of claim 1, further comprising a linear induction motor having electromagnets positioned on opposing sides of a rotatable disk coupled with the conveyance surface, the electromagnets configured to generate a magnetic field that induces eddy currents to rotate the disk to advance the conveyance surface in the conveyance direction.

3. The sorting system of claim 1, wherein the first portion of the shoe is configured to engage the container and move the container off of the conveyance surface.

4. The sorting system of claim 1, wherein the shoe has a second portion positioned on the same side of the conveyance surface as the linear induction motor comprising a ferromagnetic material, and wherein the changing magnetic field induces eddy currents in the ferromagnetic material.

5. The sorting system of claim 1, wherein the shoe comprises an opening sized and shaped to receive the slat, the opening having a protrusion that engages with a groove in the slat.

6. A system comprising:
    a conveyance surface configured to convey a container in a conveyance direction;
    a shoe movably coupled with the conveyance surface and having a portion positioned for engaging with the container; and
    a linear motor configured to generate a changing magnetic field to cause movement of the shoe in a direction other than the conveyance direction, wherein the changing magnetic field is generated based on at least a position of the container on the conveyance surface.

7. The system of claim 6, wherein the linear motor is positioned beneath the conveyance surface and oriented at an angle relative to a lateral centerline of the conveyance surface in a range between 15 degrees and 75 degrees.

8. The system of claim 6, wherein the conveyance surface is at least partially defined by a plurality of slats spanning between two chains, at least one of the chains coupled with a motor configured to advance the conveyance surface in the conveyance direction.

9. The system of claim 8, wherein the shoe defines an opening sized and shaped for receiving at least a slat of the plurality of slats, wherein the shoe is moveable along at least a part of a length of the slat.

10. The system of claim 6, further comprising a linear induction motor coupled with the conveyance surface and configured to advance the conveyance surface in the conveyance direction.

11. The system of claim 10, wherein the linear induction motor comprises a rotatable secondary coupled with a sprocket and configured to rotate in response to a changing magnetic field generated by two primaries positioned on opposing sides of the secondary.

12. The system of claim 6, wherein at least a portion of the shoe comprises a material that is induced by the changing magnetic field to generate eddy currents to cause movement of the shoe.

13. The system of claim 6, wherein the changing magnetic field causes movement of the shoe in a direction perpendicular to the conveyance direction.

14. A method comprising:
    conveying a container in a conveyance direction along a conveyance surface;
    generating a changing magnetic field that causes movement of a shoe relative to the conveyance surface in a direction other than the conveyance direction, wherein generating the changing magnetic field comprises operating a linear induction motor based on at least a position of the container; and
    as a result of the movement of the shoe, engaging the container with a portion of the shoe to cause a lateral movement of the container relative to the conveyance surface.

15. The method of claim 14, further comprising, as a result of the lateral movement of the container relative to the conveyance surface, moving the container off of the conveyance surface.

16. The method of claim 14, wherein conveying the container in the conveyance direction along the conveyance surface comprises operating a linear induction motor coupled with the conveyance surface.

17. The method of claim 14, wherein the conveyance surface is at least partially defined by a plurality of slats, and wherein causing movement of the shoe comprises causing the shoe to travel along at least a part of a length of the slat.

18. The method of claim 14, wherein conveying the container in the conveyance direction comprises conveying the container in a direction parallel to a lateral centerline of the conveyance surface.

19. The method of claim 14, wherein generating the changing magnetic field that causes movement of the shoe comprises generating a changing magnetic field that induces eddy currents in a portion of the shoe.

* * * * *